April 8, 1952        N. PLANK        2,592,464

CONTINUOUS PROPORTIONAL SAMPLER

Filed Dec. 7, 1948        2 SHEETS—SHEET 1

Inventor: Norris Plank
By *Alexander*
His Attorney

April 8, 1952 — N. PLANK — 2,592,464
CONTINUOUS PROPORTIONAL SAMPLER
Filed Dec. 7, 1948 — 2 SHEETS—SHEET 2

Inventor: Norris Plank
By [signature]
His Attorney

Patented Apr. 8, 1952

2,592,464

UNITED STATES PATENT OFFICE 2,592,464

CONTINUOUS PROPORTIONAL SAMPLER

Norris Plank, East Chicago, Ind., assignor to Shell Development Company, San Francisco, Calif., a corporation of Delaware Application December 7, 1948, Serial No. 63,864

3 Claims. (Cl. 73—422)

This invention relates to an apparatus for sampling fluids flowing through a pipe line and pertains more particularly to an apparatus for automatically collecting, throughout a predetermined time period, a continuous composite fluid sample at a rate that is substantially proportional to the quantity of the fluid flowing through the pipe line.

In the proper operation of a pipe line, such as a petroleum products pipe line, it is very desirable to effect a continuous sampling of the fluid stream in the pipe line, whereby a truly representative composite sample of said stream may be obtained for laboratory testing, and a continuous record may be kept of the quality of the stream of liquid products, as shown by the various standard gum tests, the tetraethyl lead content, flash point, etc. The proper control of blending equipment and switching methods at the input end, and the proper storage handling at the terminal end of the pipe line depend upon the continuous information of the quality of the stream at all points along the line.

Various sampling devices are well known to the art for obtaining a sample of fluid flowing through a pipe line. In general, these are subject to certain defects in that they usually require some outside source of power, which may be difficult to supply at the point where the sample is taken, or in that they are operated by some sort of a clock mechanism, whereby the individual portions which go to make up the composite sample are taken at predetermined time intervals which cannot be readily correlated with the rate of flow of fluid through the pipe line, so that the composite sample is not truly proportionally representative unless the rate of flow is constant.

The primary object of this invention is to provide a device for continuously collecting a composite sample of a fluid flowing through a pipe line at a rate proportional to the rate of flow of fluid in the pipe line, particularly where the rate of flow is not constant; that is to say, in the device according to the present invention, the composite sample is collected at a rate which varies with the rate of flow of fluid in the pipe line.

Another object of the present invention is to provide a continuous proportional sampler which may be located anywhere along the pipe line and is actuated entirely by a pressure differential produced within the pipe line, without requiring auxiliary power for its operation.

A further object of this invention is to provide a rugged and dependable continuous proportional sampler which is of simple design and is easy to operate, the sampler being adapted to collect a sample at a rate that is in the order of 1 part sample to 200,000 parts main stream.

These and other objects of this invention will be understood from the following description of the present invention, as shown in the accompanying drawing, wherein.

Figure 1:
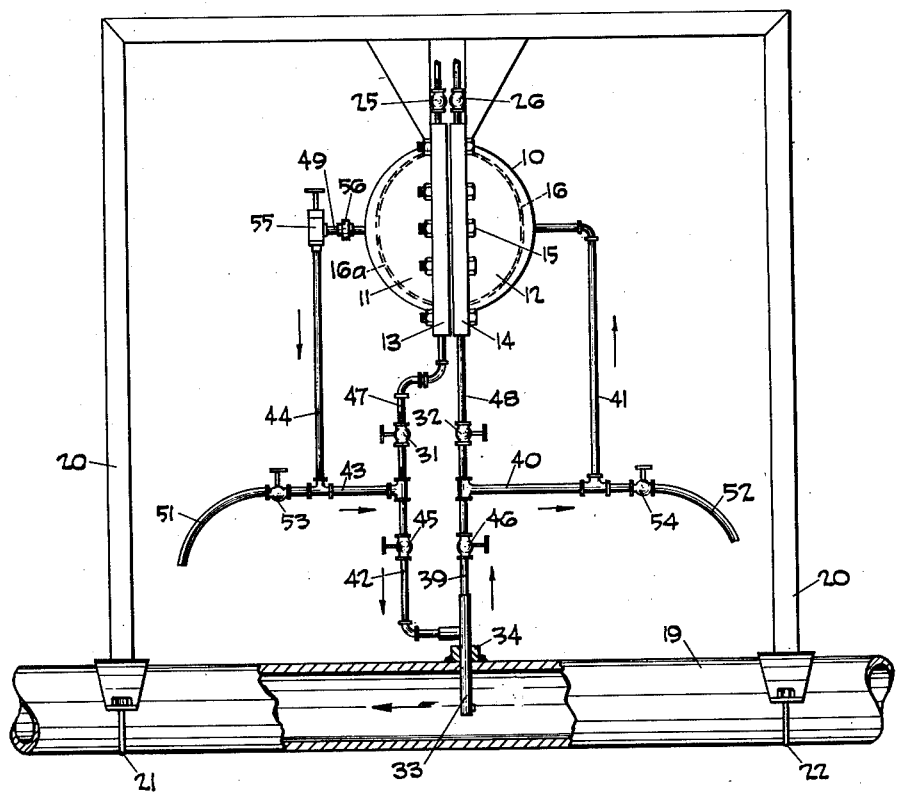
Figures 1 and 6 are diagrammatic views, partly in cross section, of two embodiments of the present continuous proportional sampler.

Referring to Figure 1 of the drawing the apparatus includes a sample container or chamber 10, preferably spherical in shape and divided into hollow hemispheres 11 and 12 which are detachably secured together by any suitable means, as by screw threads, flange and bolt means, or the like. In this embodiment flanges 13 and 14 are welded to the hemispheres 11 and 12, said flanges being fastened together by bolts 15.

Figure 2:
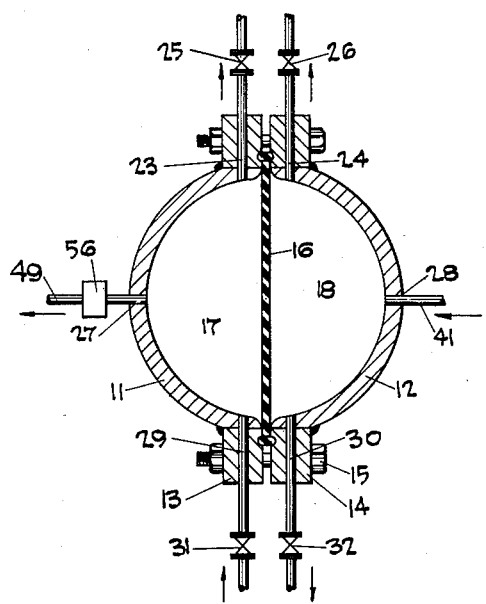
Figure 2 is a cross-sectional view of the sample chamber of the embodiment of Figure 1.
Figure 3:
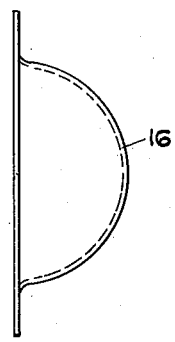
Figure 3 shows one form of a diaphragm used in the sample chamber of Figure 2.

As shown in Figure 2, a pressure-responsive movable partition member, such as a diaphragm 16 made of a suitable resilient or flexible material, is held between flanges 13 and 14 with the sample sphere 10, dividing it into first and second liquid chambers or zones 17 and 18, respectively. Preferably, the diaphragm 16 is of hemispherical shape, as shown in Figure 3, or it may be made of a sufficiently flexible material, such as rubber, whereby it may be distended to assume a shape conforming to that of the inside surface of either hemisphere 11 or 12. A shaped diaphragm, as illustrated in Figure 3, may be made of any flexible, fluid-impervious material such as rubber, synthetic rubber, rubberized canvas, oil cloth, or any suitable plastic material.

The sample chamber 10 may be mounted in any desired manner near a pipe line 19 (Figure 1) carrying therein a fluid flowing in the direction indicated by the arrow. The chamber 10 may be welded to a frame 20 which is in turn secured to the pipe line 19 by clamps 21 and 22. Preferably, the sample chamber 10 is located above the pipe line 19 and as close to it as possible.

As shown in Figure 2, the sample chamber is equipped with exhaust port means 23 and 24, normally closed by valves 25 and 26 for exhausting any gases from the liquid chambers 17 and 18, normally open port means 27 and 28 for admitting a sample to liquid chamber 18 while forcing a liquid from chamber 17 during normal operations, and port means 29 and 30, normally closed by valves 31 and 32, for admitting line fluid into chamber 17 while forcing it from chamber 18 prior to the taking of a composite sample.

The present proportional sample is operated by the flow of a liquid in the pipe line 19, a pressure differential therein being used to actuate the sampler. While a pressure differential may be obtained at any two spaced pressure taps along the pipe line 19, it is preferred to use special orifice means for producing a pressure differential. In the embodiment of Figure 1, this is obtained by inserting a pitometer 33 through a small hole in the pipe line 19 and securing it thereto in any fluid-tight manner as by welding at 34.

Figure 4:
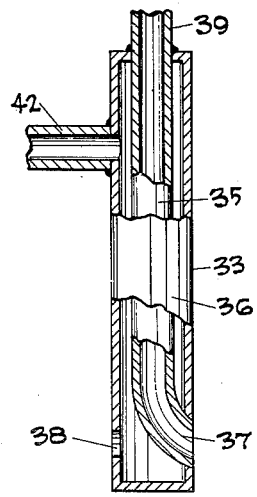
Figure 4 is a view, partly in longitudinal section of a pitometer used in the embodiment of Figure 1.

The pitometer, shown in detail in Figure 4, is a modified Pitot tube comprising two concentric Pitot tubes 35 and 36 having one pressure opening 37 facing upstream and the other pressure opening 38 facing downstream. Since liquid is flowing through the pipe line 19 in the direction indicated, pressure on the upstream opening 37 will be greater than that on the downstream pressure opening 38 and the pressure drop between the two will be a function of the rate of flow of fluid through the pipe line 19. It is to be understood that an orifice plate, Venturi tube, or any other means for producing a pressure differential may be used.

The inner or upstream Pitot tube 35 is in communication with the upstream or high pressure liquid chamber 18 through conduits 39, 40 and 41. In a like manner, the outer or downstream Pitot tube 36 is in communication with the downstream or lower pressure liquid chamber 17 through conduits 42, 43, 44 and 49. Valves 45 and 46 in conduits 42 and 39 are in an open position while a continuous sample of liquid is being taken from the pipe line 19.

The drain port 29 (Figure 2) from the lower pressure chamber 17 is in communication through conduits 47, 42 and Pitot tube 36 with the pipe line, while drain port 30 from the high pressure chamber 18 communicates with the pipe line 19 through conduits 48, 39 and Pitot tube 35. Conduits 47 and 48 are normally closed by valves 31 and 32. Instead of draining fluid back into the pipe line 19, fluid from either the low or high pressure chambers, 17 and 18 respectively, may be removed from the apparatus through sample drain lines 51 and 52 that are normally closed by valves 53 and 54.

Figure 5:
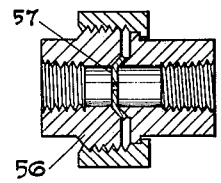
Figure 5 is an enlarged detail view of a coupling with an orifice plate mounted therein.

Means for controlling the rate at which a continuous sample is transferred from the pipe 19 to the high pressure chamber 18 is supplied by inserting suitable flow controlling means in the conduit line 49 leading from the low pressure chamber 17. For purposes of illustration, the flow controlling means in this embodiment comprises a needle valve 55 (Figure 1) and a coupling 56 having an orifice plate 57 (Figure 5) fixedly clamped therein. It is to be understood that any flow controlling means may be used, such as an orifice, valve, capillary tube, etc. or any combination of these means. Preferably, however, means of the same type, i. e., having the same flow characteristics, for example two orifice plates, are used simultaneously in both the main pipe line 19 to produce a pressure differential and in conduit 44 to control the flow therethrough.

In operation, the liquid chambers 17 and 18 (Figure 2) on either side of the diaphragm 16 may be filled with liquid from the pipe line 19 by opening valves 45, 46, 31 and 32 (Figure 1). Air or other gases may be bled from the chambers 17 and 18 (Figure 2) by opening valves 25 and 26 momentarily. Chamber 18 may be rapidly flushed with pipe line fluid by opening valves 46, 31, 32 and 53 while closing valve 45. The flow of fluid into chamber 18 will force the diaphragm 16 to the position shown at 16a in Figure 1. The fluid in chamber 17 is in turn forced out through drain conduits 47, 43 and 51. In a like manner, chamber 17 may be flushed with fluid from the pipe line 19 by opening valves 45, 31, 32 and 54 of the apparatus with all the remaining valves closed. Thus, the diaphragm 16 will come to rest against the upstream surface of the chamber 18 at which time the flow of liquid from the drain 52 stops. The drain valve 54 is then closed.

The liquid chambers may be purged as many times as desired before taking a sample. The purging operation is stopped with the separator diaphragm 16 at the end of its travel and resting against the upstream surface of the sphere, as shown at 16 in Figure 1. For purposes of description, the pipe line fluid that was rapidly run into chamber 17 to force the diaphragm 16 to the right will be called a "spot sample." At this point in the operation the entire sphere 10 is filled with the spot sample of liquid. The sample is now ready to be put on the line for continuous proportional sampling.

Valves 45, 46 and 55 are opened with all other valves being closed. Thus, an open line is provided from pipe line 19 through conduits 39, 40 and 41 to the upstream side of the sampler 10. The fluid flowing into the upstream chamber 18 forces the diaphragm to slowly move from the upstream side toward the downstream side of the chamber forcing the spot sample in downstream chamber 17 out through the small orifice 57 and thence to the main pipe line 19 through valve 55 and conduits 44, 43 and 42.

When the incoming continuous composite sample has filled the high pressure chamber 18 so that the diaphragm 16 has been forced to travel to a point at or near the downstream side 11 of the chamber 10, then the continuous composite sample may be removed from the chamber into any suitable sample container (not shown). To accomplish this, the upstream inlet valve 46 is closed, upstream and downstream freeflow valves 31 and 32 are opened and upstream drain valve 54 is opened. Thus, chamber 17 is filled with "spot sample" liquid from the pipe line as the composite sample is drained from chamber 18.

Normally the sample sphere 10 is full of liquid at all times. That portion of liquid on the upstream side of the diaphragm 16 (in chamber 18) is the continuous composite sample and that portion on downstream side is the spot sample liquid. The rate at which the continuous sample is removed from the pipe line 19 into the sample sphere 10 and the rate of travel of the diaphragm 16 from the upstream to the downstream side of the sphere is governed by the size of the opening in the flow-controlling means, in this embodiment the size of the orifice 57 and the setting of the needle valve 55. Thus, by proper setting of the flow-controlling means, a continuous sample may be collected over any desired predetermined period, such as an 8 or 24 hour period.

Figure 6:
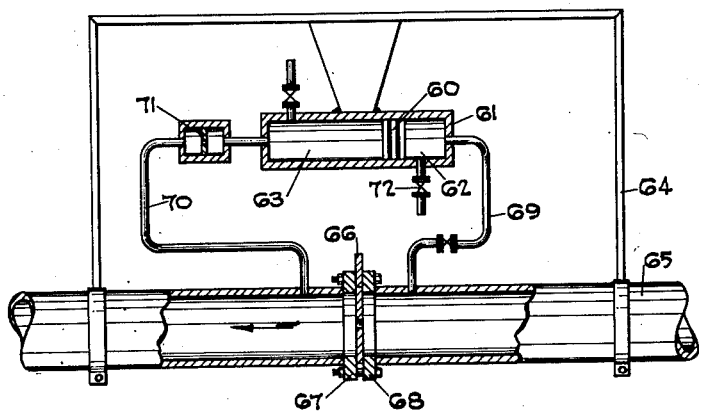

Another embodiment of the present continuous sampler is diagrammatically shown in Figure 6 utilizing a movable piston 60 as the pressure-responsive movable partition member. The piston 60 is mounted for horizontal sliding movement in a sample housing 61 and divides said chamber into upstream and downstream chambers 62 and 63, respectively. The housing 61 is in turn mounted on support means 64 above a pipe line 65. An orifice plate 66 is fixedly secured between flanges 67 and 68 of said pipe line creating a pressure differential therein. The high pressure side of the orifice plate 66 is in communication with the upstream or continuous composite sample chamber 62 of the sample housing through a conduit 69. A second conduit 70, having an orifice plate 71 therein, communicates between the downstream chamber 63 and the low pressure side of the orifice plate 66. The housing 61 is also provided with fluid outlet means 72 for removing the continuous composite sample from the upstream chamber 62. It is evident that this embodiment operates in a manner similar to the first embodiment previously described.

I claim as my invention:

1. A device for continuously sampling a fluid flowing in a pipe line, comprising pitometer means in said pipe line for producing a pressure differential in the pipe line proportional to the rate of flow therein, a fluid-tight sample container, pressure-responsive movable partition means dividing said container into two pressure chambers, valve controlled conduit means in communication between one of said pressure chambers and the upstream side of said pitometer means, valve controlled conduit means in communication between the other pressure chamber and the downstream side of said pitometer means, flow restricting means in one of said conduit means, normally closed first and second valved bleed conduits through the wall of said container near the top thereof and in communication between said two pressure chambers and the space outside said container for bleeding gases therefrom, and normally closed valve controlled fluid outlet means in the wall of said container and leading from said upstream pressure chamber for removing a fluid sample therefrom.

2. A device for continuously sampling a fluid flowing in a pipe line, comprising pitometer means in said pipe line for producing a pressure differential in the pipe line proportional to the rate of flow therein, a fluid-tight spherical sample container, pressure-responsive movable diaphragm means dividing said container into two pressure chambers, first conduit means in communication between one of said pressure chambers and the high pressure side of said pitometer means, second conduit means in communication between the other pressure chamber and the low pressure side of said pitometer means, orifice means in one of said conduit means, a valve in each of said first and second conduit means, third and fourth valved conduits in communication between said high and low pressure chambers and said first and second conduit means at a point between the valves therein and the container, and normally closed outlet means in communication with said high pressure chamber for removing a fluid sample therefrom.

3. A device for continuously sampling a fluid flowing in a pipe line which comprises pitometer means in said pipe line for producing a pressure differential in the pipe line proportional to the rate of flow therein, a fluid-tight spherical sample container, said sample container comprising two flanged hemispherical sections bolted together, pressure-responsive movable diaphragm means dividing said container into two pressure chambers, the periphery of said diaphragm means being fixedly secured between said flanged sections, first conduit means in communication between one of said pressure chambers and the upstream side of said pitometer means, second conduit means in communication between the other pressure chamber and the downstream side of said pitometer means, a flow restrictor in said second conduit means, a valve in each of said first and second conduit means, third and fourth valved conduits in communication between said high and low pressure chambers and said first and second conduit means at a point between the valves therein and the container, normally closed outlet means from said upstream pressure chamber for removing a fluid sample therefrom, and normally closed drain means from said downstream pressure chamber.

NORRIS PLANK.

REFERENCES CITED

The following references are of record in the file of this patent:

UNITED STATES PATENTS

| Number | Name | Date |
| --- | --- | --- |
| 1,041,432 | Cole | Oct. 15, 1912 |
| 1,287,274 | Fisher | Dec. 10, 1918 |
| 1,451,064 | Dunajeff | Apr. 10, 1923 |
| 1,893,200 | Dolbey et al. | Jan. 3, 1933 |
| 2,277,714 | Polston et al. | Mar. 31, 1942 |
| 2,315,185 | Boyle | Mar. 30, 1943 |
| 2,350,323 | Cochran et al. | June 6, 1944 |
| 2,396,653 | Hermanny | Mar. 19, 1946 |